United States Patent [19]

Kranz et al.

[11] 4,351,479
[45] Sep. 28, 1982

[54] JET ENGINE WITH A THRUST VECTOR CONTROL

[75] Inventors: Walter Kranz, Taufkirchen; Heinz Tillmann, Ottobrunn, both of Fed. Rep. of Germany

[73] Assignee: Messerschmitt-Bölkow-Blohm GmbH, Fed. Rep. of Germany

[21] Appl. No.: 154,428

[22] Filed: May 29, 1980

[30] Foreign Application Priority Data

Jun. 2, 1979 [DE] Fed. Rep. of Germany ....... 2922576

[51] Int. Cl.³ .............................................. B64C 15/10
[52] U.S. Cl. .................................. 239/265.23; 60/231
[58] Field of Search ...................... 239/265.17, 265.23; 60/230, 231, 264; 137/803, 834, 838, 839

[56] References Cited

U.S. PATENT DOCUMENTS

| | | | |
|---|---|---|---|
| 3,325,103 | 6/1967 | Abbott | 239/265.17 |
| 3,420,060 | 1/1969 | Ostroff et al. | 239/265.23 X |
| 3,698,642 | 10/1972 | McCullough | 239/265.23 |
| 3,737,103 | 6/1973 | Howell et al. | 239/265.23 |
| 3,780,763 | 12/1973 | Wisniewski | 60/231 |
| 4,063,685 | 12/1977 | Jacobs | 239/265.23 X |

FOREIGN PATENT DOCUMENTS

| | | | |
|---|---|---|---|
| 2102240 | 4/1975 | Fed. Rep. of Germany | 239/265.23 |
| 1240747 | 7/1975 | Fed. Rep. of Germany | 239/265.23 |

Primary Examiner—Robert B. Reeves
Assistant Examiner—Gene A. Church
Attorney, Agent, or Firm—McGlew and Tuttle

[57] ABSTRACT

A jet engine comprises a housing which defines a combustion chamber section, a narrowed diameter neck thrust nozzle section and an outwardly diverging portion which includes a part of the thrust nozzle section end in an extension outwardly from the thrust nozzle section. The outer end of the extension or the continuation of the thrust nozzle ends in a discharge opening for thrust gases and the vector of these thrust gases is controlled by control fluid which is selectively added into the divergent section at a location along its length such that it will be added in a selected narrow thrust jet zone in which the internal pressure on the nozzle edge of the thrust jet attains the ambient pressure or even drops below it. A complete control system for a thrust engine includes for example two sets of diametrically opposed longitudinal rows of slots which are selectively connected to control fluid for admitting the control fluid at one of the four diametric slot locations and at a selected length along the divergent portion of the nozzle to achieve the desired control vector.

11 Claims, 3 Drawing Figures

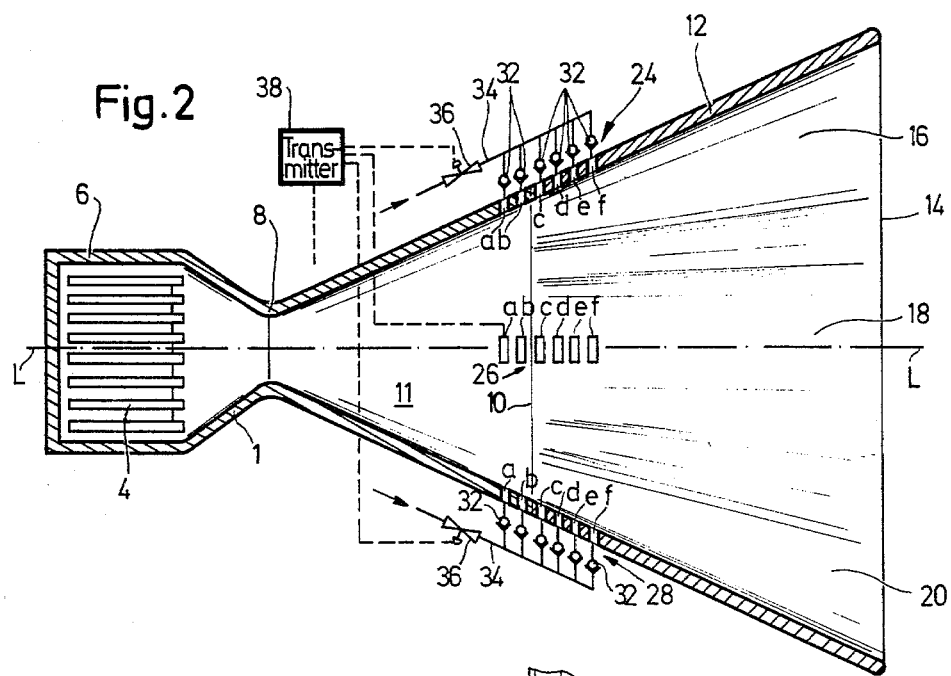
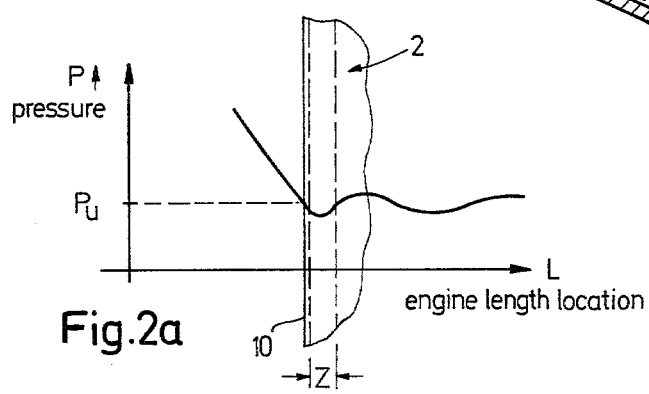

JET ENGINE WITH A THRUST VECTOR CONTROL

FIELD AND BACKGROUND OF THE INVENTION

This invention relates in general to the construction of thrust engines and in particular to a new and useful thrust engine which includes a combustion chamber connected to a nozzle having a narrow neck portion of smaller diameter and a divergent portion which may advantageously include an extension which is provided with means for directing a control fluid therein for influencing the direction of the thrust vector.

The invention relates particularly to a jet engine with thrust vector control, where the thrust nozzle has an extension adjoining the nozzle end, which is widened beyond the expansion ratio corresponding to the ambient pressure, and wherein at least one selectively controllable control fluid feed point for the input of fluidic control pulses effecting a deflection of the thrust jet in the corresponding direction, is arranged in an end zone at the inlet end of the extension.

Jet engines of this type, work similar to fluidic elements by utilizing the Coanda effect with fluidic jet deflection by control pulses which are put-in, either temporarily, or, if the thrust jet does not adhere automatically on the thrust nozzle extension under the action of the Coanda effect, are applied for the duration of the jet deflection. It is known, with such engines, to arrange several selectively controllable parts acting in a main direction of deflection, distributed over the circumference of the nozzle in the range of the inlet end of the extension at a point where the narrow zone is formed which is particularly favorable for the deflection of the jet. At such locations the gas pressure in the thrust jet attains for the first time substantially the ambient pressure, or even drops below it, and an effective jet deflection can be obtained by weak control pulses. But this known fluidic jet deflection method has the disadvantage that the sensitive thrust jet zone does not remain stationary in the thrust nozzle or its extension in operation, but is displaced in the longitudinal direction of the nozzle in dependence on the combustion chamber pressure, on the ambient pressure, or on variations of the nozzle geometry, for example, as a result of melting of the inner boundary walls of the thrust nozzle. In this case the control fluid feed openings are no longer covered by this narrow thrust jet zone, and jet deflection is only possible with much stronger control pulses in terms of quantity and pressure, or the deflection stops completely, for example, when air with ambient pressure is sucked into the thrust nozzle zone by utilizing the vacuum in an input of control pulses, while the air intake openings, as a result of the displacement of the vacuum zone, are no longer under their influence.

SUMMARY OF THE INVENTION

The invention provides a jet engine in which the control fluid supply is varied automatically in synchronism with the travel movements of the sensitive thrust jet zone, and an effective jet deflection with weak current pulses is insured even with a variation of the pressure ratio or of the nozzle geometry.

According to the invention a jet engine includes a row of ports arranged in series in the longitudinal direction of the nozzle and opening into the edge zone, and at least the first port in the row, at which the internal pressure at the thrust jet end drops below a given limiting value, is opened for the supply of control fluid, while at the port arranged upstream of this first port, the supply of control fluid is blocked at an internal pressure above the limiting value.

In the jet engine according to the invention, the arrangement of a row of successive ports extending over the entire possible displacement range of the sensitive thrust nozzle zone, which act each in one direction of deflection, and the special type of control fluid supply ensures that the sensitive thrust jet zone always covers at least one port in the row, even in a travel movement, and that this port is opened for the control fluid supply upon the input of control pulses. The thrust vector control therefore works with a steady, high degree of efficiency, that is, uninfluenced by fluctuations in the pressure ratio or melt-related changes in the nozzle geometry, and an effective jet deflection with small amounts of control fluid is ensured. Because of the uniformly low control fluid consumption, the effective flow cross section of the ports can be kept small, and the opening and closing time at the start and at the end of the control pulse input can be shortened, so that the jet engine according to the invention is superior to known comparable systems, not only in terms of efficiency, but also as far as the speed and accuracy of the thrust vector control is concerned.

In a further advantageous embodiment of the invention, all ports of a row with an internal pressure below the limiting value are preferably opened for the supply of control fluid upon the input of control pulses, so that the control pulses are fed-in simultaneously over several control pulses acting in the same direction of deflection into the sensitive thrust nozzle zone, so that the operating speed of the thrust vector control is further increased.

The limiting value determinant for the selection of the ports to be opened in a control pulse input is in a particularly simple and expedient manner the control fluid apply pressure. In this case, it is advisable to design the control mechanism for the ports associated with a row, for reasons of a simple design, in such a way that a control valve is arranged between each port of a row and a control fluid feed pipe common to all ports of this row, and is opened for the duration of the control pulse input at the corresponding port if the internal pressure is below the feed pipe pressure. In order to further simplify the construction, the control valves can be designed as non-return valves which open automatically toward the edge zone when the internal pressure drops below the feed pipe pressure.

As mentioned above, the gas pressure in the narrow sensitive thrust nozzle zone is below the ambient pressure, which is preferably utilized to take in air under ambient pressure as a control fluid during a control pulse input over the ports covered by the thrust nozzle zone.

In order to deflect the jet in different directions, several rows of successive ports are preferably arranged on the outer circumference of the thrust nozzle or of the extension, distributed in circumferential direction, to permit a thrust vector control in several main planes, hence both in pitching-and in yawing direction.

The locations and axial length of each row of ports depends naturally on the location and size of the travelling fields of the thrust nozzle zone in the thrust nozzle, and its extension respectively and therefore must be determined separately in each case in dependence on the expected changes in the nozzle geometry and pressure fluctuations of the combustion chamber and ambient pressure. In general, the travel movements of the sensitive thrust nozzle zone, however, do not extend very far into the thrust nozzle, but take place mainly in the end section of the extension at the thrust nozzle. For this reason, each row of ports is preferably arranged in the end region of the thrust nozzle, starting with a plurality of the ports in the range of the extension.

Accordingly it is an object of the invention to provide a thrust engine which includes a combustion chamber connected to a nozzle section which has a narrow diameter neck portion with an outwardly widening divergent portion and which includes means for directing thrust gases through at least a selected one of a plurality of nozzles opening into the interior of the divergent section of the nozzle at a location along the length of the divergent section to provide a selected thrust vector control influence.

A further object of the invention is to provide a thrust engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a sectional view of the engine shown in FIG. 1; and

FIG. 2a is a diagrammatical representation of the qualitative pressure gradient in the edge zone between the thrust nozzle and an extension of the thrust nozzle for the engine shown in FIG. 2.

DETAILED DESCRIPTION OF PREFERRED EMBODIMENTS

Figure 1:
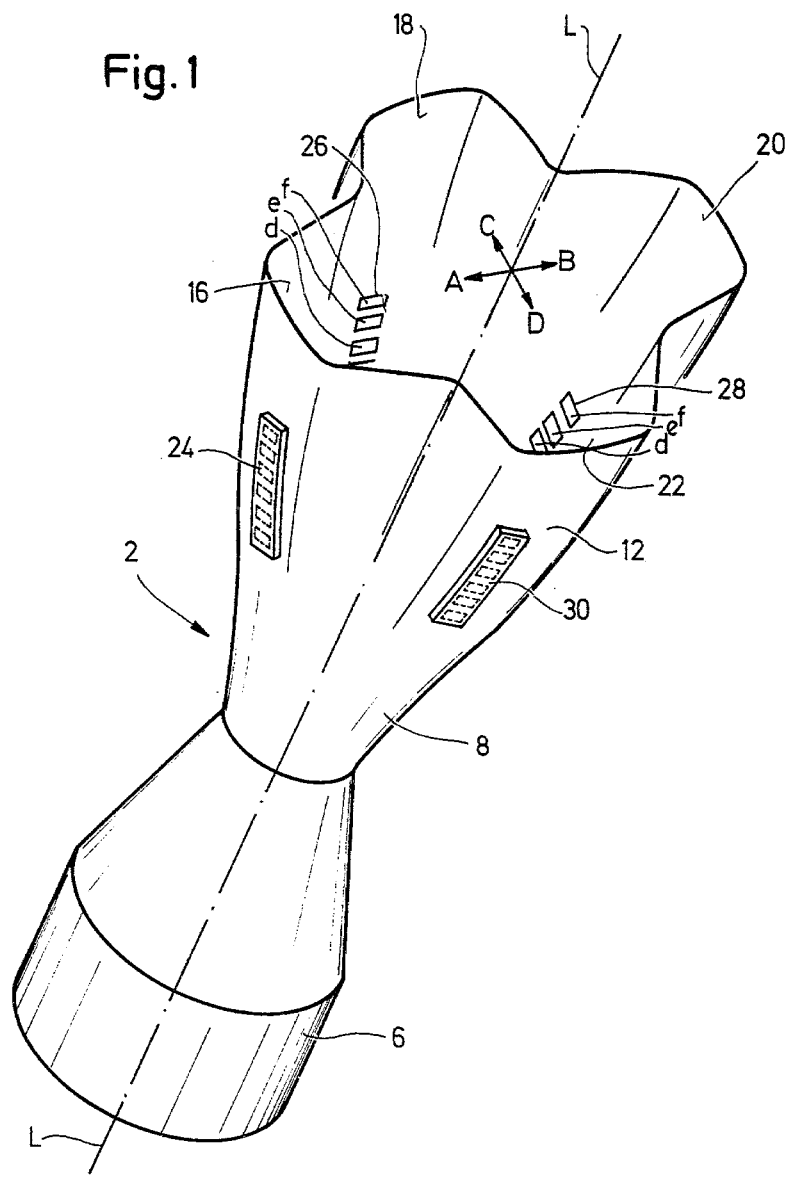
FIG. 1 is a partial end perspective view of a thrust engine constructed in accordance with the invention.

Referring to the drawings in particular, the invention embodied therein comprises a jet engine which includes a housing 2 combining a combustion chamber 6 with a thrust nozzle 7 connected to the combustion chamber which includes a converging portion leading to a narrow diameter neck 8 and a divergent section 11 which is joined at its outer end 10 to an extension piece 12. In accordance with the invention, thrust gases which are generated by the ignition of a solid charge 4 in the combustion chamber 6 are directed out through the nozzle section 11 and in order to influence the resultant thrust vector of the engine, in accordance with the invention a control fluid is directed through a slot opening or port opening of a plurality of ports which are defined along the length of the divergent section of the nozzle part 7 or its extension 12 at a location where the most desirable pressure effects will be present on the gases so that they may be easily controlled.

Jet engine 2 contains as main parts, the combustion chamber 6 equipped with the solid propellant composition or charge 4, and, for example, thrust nozzle part 8 adjoining the combustion chamber, which widens or diverges outwardly corresponding to the nominal expansion ratio. The engine 2 has extension 12 adjoining the end 10 of the nozzle part 8 with four pocket-shaped or trough-shaped wall sections 16, 18, 20, 22 arranged in a cross form to the longitudinal axis L of thrust nozzle 8 in continuation of the divergent thrust nozzle section 11 widening toward an outlet or discharge end 14 of the extension. The thrust jet bears on a respective section 16, 18, 20 or 22 in a jet deflection relative to the longitudinal axis L, and is deflected into one of the pockets 16 and 20 respectively to generate a pitching moment (deflection direction A, B) and into one of the pockets 18 and 22 respectively to generate a yawing movement (deflection direction C,D).

The jet deflection is effected to fluidic control pulses, and in order to keep the required control fluid throughput at a minimum, these control pulses must be fed into a narrow thrust jet zone Z (FIG. 2a), in which the internal pressure on the nozzle edge at the thrust jet end 10 attains for the first time the ambient pressure $P_u$, or even drops below it. This deflection-sensitive vacuum zone Z of the thrust jet does not remain stationary at the nozzle end 10, but is displaced more or less far into the inlet range of extension 12 depending on the melt-related changes of the nozzle geometry, for example, or on fluctuations in the pressure ratio between the combustion chamber and ambient pressure, or the zone Z moves in the opposite direction here generally only by a short distance, from nozzle outlet cross-section 10 to the thrust nozzle neck 8.

Over the range of the travel movements of thrust nozzle zone Z extends for each pocket 16 to 22 a row 24, 26, 28, 30 of slot-shaped ports a, b, c, arranged in series in the longitudinal direction of the nozzle, which traverse the wall of the thrust nozzle part 8, or the vortex-shaped wall section of the respective pocket of extension 12. In the represented embodiment, each row comprises six ports or slots, of which the first two a,b, are provided, in agreement with the above described travel movement of the thrust jet zone Z, in the end range of thrust nozzle part 8 and the remaining four—c,d,e,f—in the inlet range of extension 12. The individual ports of each slot row are connected to a control fluid feed pipe 34 (FIG. 2) common to all ports of this row, with the interposition of a non-return valve 32 opening toward the respective port, into which the control fluid, e.g. air under ambient pressure, flows after a corresponding shut-off valve 36 arranged in the path of feed pipe 34 has been opened. The shut-off valves 36 are e.g. electrically operated solenoid valves which are controlled selectively upon the instruction of a central control signal transmitter 38.

As soon as one of the shut-off valves is opened, air flows under ambient pressure into the corresponding pipe feed 34 and is sucked from there over those non-return valves and following ports laterally into the thrust jet, in the vacuum zone Z. Hence, according to FIGS. 2 and 2a the control fluid moves into the position of vacuum zone Z shown there, while the other ports, where the internal pressure is above the ambient pressure, including their associated non-return valves, remain closed. But if vacuum zone Z travels to the left or right in the sense of FIG. 2a, the control pulse input is also displaced toward ports corresponding in size and direction to this travel movement.

The control pulse input can also be effected with a different gaseous, or particularly liquid medium, instead of air, and under a higher than ambient pressure, hence e.g. with air under dynamic pressure, as a control fluid.

The higher the control fluid supply pressure is selected, the more ports are opened for the control pulse input, in addition to those in the thrust jet zone Z. But here again the control fluid throughput is greatest at those ports, independent of the travel movements of the sensitive thrust jet zone Z, in which the internal pressure passes through a (first) minimum, which open into the thrust jet zone z and have the greatest jet deflection.

The control of the various slot rows 24 to 30 over the respective shut-off valves 36 and control signal transmitter 38 is effected in a known manner in this way that, when the thrust jet is switched to longitudinal axis L, hence in a sure axial thrust, all shut-off valves 36 are either opened or closed jointly. But if the thrust jet is to be deflected in a lateral direction, producing a transverse thrust component, the row of ports arranged in this direction remains closed or is closed for the control fluid supply by operating the respective shut-off valves 36, and the diametrically opposed row is opened or remains open for the input of control signals by the respective control valve 36. If the thrust nozzle and the extension work in the manner of a stable fluidic element, the unsymmetrical control pulse input is only necessary for the duration of a switching process, that is, as soon as the thrust jet is deflected into one of the pockets 16 to 22, it remains automatically and without any further control pulse input in this switching stage under the action of the Coanda effect.

While specific embodiments of the invention have been shown and described in detail to illustrate the application of the principles of the invention, it will be understood that the invention may be embodied otherwise without departing from such principles.

What is claimed is:

1. A jet engine comprising:
   a housing defining a combustion chamber for generating expanding gases;
   a thrust nozzle mounted downstream of said combustion chamber having a constricted neck portion and an adjacent diverging nozzle section widening outwardly from said neck portion;
   a thrust nozzle extension having an inlet end connected to said nozzle section and widening outwardly from said nozzle section by a proportion greater than a ratio of expansion of an ambient pressure of the expanding gas;
   said nozzle section and nozzle extension having a plurality of control fluid supply ports in the vicinity of said inlet end, disposed in at least one row extending in a longitudinal direction of said nozzle section and nozzle extension, for passing fluidic control pulses to said extension to cause a deflection of the expanding gases; and
   control fluid supply means connected to said ports for supplying control fluid through said ports as a function of a peripheral inside pressure exerted by the expanding gases on an inside surface of said extension, so that a first supply port in said row at which the inside pressure falls below a predetermined limit value is opened for the supply of control fluid therethrough and any supply port upstream of said first supply port at which the inside pressure is above said predetermined limit value, is closed.

2. A jet engine according to claim 1, wherein said control fluid supply means is operable to open each one of said ports at which the inside pressure is below said predetermined limit value.

3. A jet engine according to claim 1, wherein said control fluid supply means is operable to supply control fluid through opened ones of said ports at a pressure substantially equal to said predetermined limit value.

4. A jet engine according to claim 1, wherein said control fluid supply means comprises a common control fluid feed line for each row of said ports, a control vavle connected between each one of said ports in said row and said common control fluid feed line for said row, each control valve being opened for the duration of a control pulse when the inside pressure falls below a pressure of fluid in said common control fluid feed line.

5. A jet engine according to claim 4, wherein each of said control valves comprises a non-return valve which opens automatically toward an interior of said nozzle section and extension when the inside pressure drops below said control fluid feed line pressure.

6. A jet engine according to claim 1, wherein said control fluid supply means supplies air under an ambient pressure outside the jet engine as the control fluid.

7. A jet engine according to claim 1, including additional rows of said ports extending in the longitudinal direction of said nozzle section and nozzle extension, circumferentially spaced from each other and circumferentially spaced from said former mentioned row, around said nozzle section and nozzle extension.

8. A jet engine according to claim 7, wherein each of said rows includes a first number of ports extending into said nozzle section and a second larger number of ports extending into said nozzle extension.

9. A jet engine according to claim 1, wherein said at least one row of ports includes a first number of ports extending into said nozzle section and a second larger number of ports extending into said nozzle extension.

10. A jet engine according to claim 1, including a plurality of circumferentially spaced rows of longitudinally extending ports in addition to said at least one row of ports, and additional control fluid supply means connected to each of said additional rows of ports, each of said control fluid supply means comprising a common fluid supply line and a check valve connected between each port of its respective row and the fluid supply line of that row, each check valve blocking fluid flow from said nozzle section and nozzle extension and permitting fluid flow into said nozzle section and nozzle extension when the inside pressure drops below said predetermined limit value.

11. A jet engine according to claim 10, wherein each of said rows is arranged at a downstream region of said nozzle section and an upstream region of said nozzle extension.

* * * * *